United States Patent
Chen

(10) Patent No.: US 12,422,737 B2
(45) Date of Patent: Sep. 23, 2025

(54) HEAT REFLECTION LIGHT VALVE OF LCD PROJECTOR AND PROJECTOR

(71) Applicant: Changsha Pujiade Photoelectric Technology Co., Ltd, Changsha (CN)

(72) Inventor: Ling Chen, Changsha (CN)

(73) Assignee: Changsha Pujiade Photoelectric Technology Co., Ltd, Changsha (CN)

( * ) Notice: Subject to any disclaimer, the term of this patent is extended or adjusted under 35 U.S.C. 154(b) by 456 days.

(21) Appl. No.: 17/971,166

(22) Filed: Oct. 21, 2022

(65) Prior Publication Data

US 2023/0273509 A1 Aug. 31, 2023

(30) Foreign Application Priority Data

Feb. 26, 2022 (CN) .......................... 202210180787.9

(51) Int. Cl.
*G03B 21/00* (2006.01)
*G02F 1/1335* (2006.01)
*G03B 21/20* (2006.01)

(52) U.S. Cl.
CPC ..... *G03B 21/006* (2013.01); *G02F 1/133512* (2013.01); *G02F 1/133519* (2021.01); *G03B 21/2033* (2013.01); *G03B 21/2066* (2013.01)

(58) Field of Classification Search
CPC .............. G03B 21/066; G03B 21/2033; G03B 21/20566; G02F 1/133351; G02F 1/133512
USPC .......................................................... 353/31
See application file for complete search history.

(56) References Cited

U.S. PATENT DOCUMENTS 10,859,900 B1 12/2020 Guo
2021/0124242 A1* 4/2021 Guo .................. G03B 21/2033

FOREIGN PATENT DOCUMENTS

| CN | 103235440 A | * | 8/2013 | ....... G02F 1/133514 |
| CN | 213545027 U | | 6/2021 | |
| CN | 113777861 A | | 12/2021 | |

OTHER PUBLICATIONS

Translation of CN 103235440 (Year: 2025).*

* cited by examiner

*Primary Examiner* — Jerry L Brooks

(57) ABSTRACT

The present invention discloses a heat reflection light valve of an LCD (Liquid Crystal Display) projector and a projector. The heat reflection light valve comprises an upper glass substrate, a lower glass substrate and a liquid crystal box clamped between the upper glass substrate and the lower glass substrate, and a TFT (Thin Film Transistor) array is produced on the lower glass substrate; and a CF (Color Filter), a BM (Black Matrix), an OC (Over Coater), a transparent electrode and a post spacer are produced on the upper glass substrate. A layer of reflection film for reflecting blue light is produced on the inner surface of the upper glass substrate, and the reflection film is not produced in a region corresponding to a blue filter matrix of the CF.

8 Claims, 8 Drawing Sheets

HEAT REFLECTION LIGHT VALVE OF LCD PROJECTOR AND PROJECTOR

CROSS REFERENCE TO RELATED APPLICATIONS

This application claims foreign priority of Chinese Patent Application No. 202210180787.9, filed on Feb. 26, 2022 in the China National Intellectual Property Administration, the disclosures of all of which are hereby incorporated by reference.

TECHNICAL FIELD

The present invention relates to the technical field of projection, and particularly relates to a heat reflection light valve of an LCD (Liquid Crystal Display) projector and a projector.

BACKGROUND OF THE PRESENT INVENTION

On a single-LCD projector of a full color light valve (also called "juxtaposition additive color mixture") or a 2-LCD projector adopting "strengthened juxtaposition additive color mixture" or "quasi-instantaneous additive color mixture", each light valve is provided with a CF (Color Filter). With reference to the part of the CF of the full color light valve shown in FIG. 6; each pixel comprises three subpixels (i.e., three primary colors: red, green and blue); and light valves with different product positioning have different color gamuts, and the main reason is that the three subpixels have different light resistance properties (Color Resist). For another example, a 2-LCD projector disclosed by the U.S. patent Ser. No. 10/859,900B1 at least needs a light valve (a double color light valve) to complete display of two primary colors in the three primary colors, and needs another LCD light valve to complete display of another primary color in the three primary colors, and light combination is carried out on the two LCD light valves by adopting a spatial manner, i.e., strengthened juxtaposition additive color mixture, so as to realize display of a full color image. Two primary colors of CFs are produced on the double color light valve; and when a projector pursues higher brightness output, a blue filter matrix and a red filter matrix are produced on the light valve generally.

Each primary color of filter must block other colors in illuminating rays to pass, and the blocking adopts an absorption manner generally. The absorbed energy is converted into joule heat, so that a CF material deteriorates at high temperature and under the photochemical effect.

In a production process of the light valves, a black matrix (called a BM for short) has gradually eliminated a chromium (Cr) metal material and a process which have poor environmental protection property and low heat productivity (since part of rays irradiated on the BM is reflected by Cr, only a part of rays is absorbed) in recent years, so that a carbon black polypropylene resin material is used for producing the BM; and the carbon black polypropylene resin material can nearly absorb 100% rays and hardly have reflection, and therefore, the BM is also an important heating source of the LCD light valve.

Generally, the illuminating rays of the single-LCD projector and the 2-LCD projector enter from an upper glass substrate, and after being modulated by a liquid crystal box and a TFT (Thin Film Transistor) matrix of a lower glass substrate sequentially, the illuminating rays are output. Under the situation of irradiation of polarized light, the heating of the above LCD light valve is mainly focused on the upper glass substrate.

For most important indexes of the LCD projector, such as user experience, durability, output brightness and the like, a critical constraint bottleneck is a heat radiating constraint of the LCD light valve, so how to radiate the heat for the LCD light valve more efficiently or reduce the heat productivity of the LCD light valve is a critical problem which needs to be innovated constantly and solved with great efforts by projector practitioners in the past and in the future.

SUMMARY OF PRESENT INVENTION

The present invention aims to provide a heat reflection light valve of an LCD projector, so as to solve the technical problems of the prior art that the heat productivity of an LCD light valve is high, the heat radiating difficulty is big, and the user experience is poor. The technical solution used for solving the technical problems in the present invention is:

The heat reflection light valve of the LCD projector comprises an upper glass substrate, a lower glass substrate and a liquid crystal box clamped between the upper glass substrate and the lower glass substrate; a TFT array is produced on the lower glass substrate; a CF, a BM, an over coater, a transparent electrode and a post spacer are produced on the upper glass substrate; the CF comprises a red filter matrix, a green filter matrix and a blue filter matrix; illuminating rays of the projector enter from the upper glass substrate, and after being modulated by the liquid crystal box and the TFT array of the lower glass substrate, the illuminating rays are irradiated out; a layer of reflection film for reflecting blue light is produced on the inner surface of the upper glass substrate, and the reflection film is not arranged in a region corresponding to the blue filter matrix.

Further, the reflection film for reflecting the blue light can also be produced on an incident plane of the upper glass substrate, and the reflection film is not arranged in a region corresponding to the blue filter matrix.

Further, the reflectivity of the reflection film is greater than or equal to 95% within the wavelength range of 420-450 nm at least and is cut off completely when the wavelength is greater than or equal to 475 nm, and the reflection film can transmit rays with the wavelength of greater than or equal to 475 nm.

Further, the heat reflection film is produced by adopting any one of a vacuum evaporation coating method, a magnetron sputtering coating method or a vapor deposition method.

A projector is provided. The projector comprises a heat reflection light valve of the above-mentioned LCD projector and further comprises a white LED (Light-Emitting Diode) light source, an illuminating device and an imaging device; and the white LED light source, the illuminating device, the heat reflection light valve and the imaging device are sequentially arranged according to the marching direction of rays.

The present invention has the beneficial effects that: a layer of reflection film for reflecting blue light is produced on the inner surface of the upper glass substrate, and the reflection film is not produced in the region corresponding to the blue filter matrix; and therefore, all the illuminating rays can irradiate the blue filter matrix in the region, but the blue part of the illuminating rays does not irradiate the red filter matrix, the green filter matrix and the BM surrounding the red filter matrix and the green filter matrix. Since the red filter matrix absorbs green light and does not absorb blue light, and the green filter matrix absorbs red light and does not absorb blue light, the heating productivity of the regions corresponding to the red filter matrix, the green filter matrix and the BM surrounding the red filter matrix and the green filter matrix is reduced by ⅓, i.e. over ⅔ of the region on the LCD light valve does not absorb blue light, thereby greatly reducing the heat radiating burden of the LCD light valve and having the positive effects on improvement of noise of a heat radiating fan of the LCD light valve and poor brightness uniformity; and in another aspect, after the light valve with the reflection film produced in the present invention is installed, a color cast phenomenon is greatly improved, and good viewing and experience feelings of users are enhanced.

DESCRIPTION OF THE DRAWINGS

To more clearly describe the technical solutions in the embodiments of the present invention or in the prior art, the drawings required to be used in the description of the embodiments or the prior art will be simply presented below. Obviously, the drawings in the following description are merely some embodiments of the present invention, and for those ordinary skilled in the art, other drawings can also be obtained according to the drawings without contributing creative labor.

DETAILED DESCRIPTION OF PREFERRED EMBODIMENTS

To better understand the technical solution of the present invention for those skilled in the art, the present invention will be explained below in detail in combination with the drawings. The description in this part is demonstrative and interpretative only and shall not limit the protection scope of the present invention.

It should be noted that similar reference signs and letters indicate similar items in the following drawings. Therefore, a certain item will not be further defined and explained in the subsequent drawings once defined in one drawing.

It should be noted that terms of "center", "upper", "lower", "left", "right", "vertical", "horizontal", "inner" and "outer" indicate direction or position relationships shown based on the drawings or direction or position relationships in which the product of the present invention is usually placed in use, and are only intended to facilitate the description of the present invention and the simplification of the description rather than to indicate or imply that the indicated device or element must have a specific direction or constructed and operated in a specific direction, and therefore, shall not be understood as a limitation to the present invention. In addition, the terms of "first", "second" and "third" are only used for distinguishing the descriptions, rather than being understood to indicate or imply relative importance.

In addition, the terms of "horizontal", "vertical" and "pendant" do not indicate that the component is required to be absolutely horizontal or pendant, but can be slightly tilted. For example, "horizontal" only means that the direction is more horizontal relative to "vertical", and does not mean that the structure must be completely horizontal, but can be slightly tilted.

It should be noted in the explanation of the present invention that, unless otherwise specifically regulated and defined, terms such as "arranged", "installation", "connected", and "connecting" shall be understood in broad sense, and for example, may refer to fixed connection or detachable connection or integral connection, may refer to mechanical connection or electrical connection, and may refer to direct connection or indirect connection through an intermediate medium or inner communication of two elements. For those ordinary skilled in the art, the specific meanings of the above terms in the present invention may be understood according to specific conditions.

Figure 6:
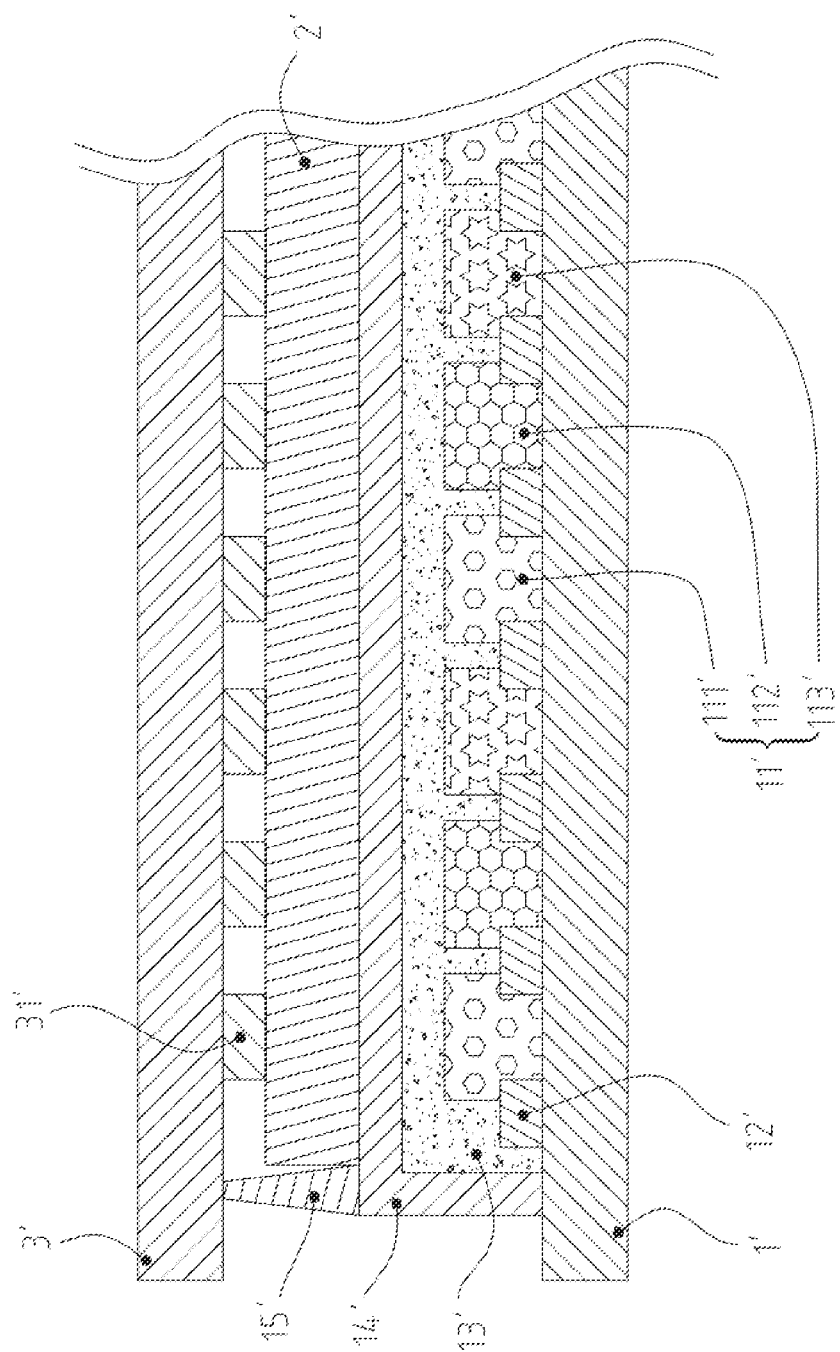
FIG. 6 is a cross-section schematic diagram of an existing full color light valve.

Since the technology of LCD light valves is very professional, in order to describe and show the purpose of the present invention clearly, with reference to an existing product shown in FIG. 6, such an ITO (Indium Tin Oxide) structure is generally suitable for an LCD light valve with a display mode of TN (Twist Nematic) or VA (Vertical Alignment) and is also a preferable display mode of an LCD light valve for projection application generally. In the figure, the existing product comprises an upper glass substrate 1', a lower glass substrate 3' and a liquid crystal box 2' clamped between the upper glass substrate 1' and the lower glass substrate 3'; and a TFT array 31' is produced on the lower glass substrate 3'. Of course, specific microstructures of some other materials such as a data cable, a scanning line, each storage capacitor, channels of TFTs and the like are not drawn in FIG. 6 and are not repeated. The TFT array 31' shown in FIG. 6 is transparent pixel electrodes of the TFTs actually.

A CF 11', a BM 12', an over coater (called an OC for short) 13', a transparent electrode (i.e. indium tin oxide, called ITO for short) 14', a post spacer (called a PS for short) 15' and other components are produced on the upper glass substrate 1', which are basic structures of the LCD light valve; and in addition, microstructures such as an alignment layer (not drawn) and the like are not repeated. The CF 11' comprises a red filter matrix 111', a green filter matrix 112' and a blue filter matrix 113'; and illuminating rays of a projector enter from the upper glass substrate 1', and after being modulated by the liquid crystal box 2' and the TFT array 31' of the lower glass substrate 3', the illuminating rays are irradiated out.

For the convenience of understanding, it is assumed that illuminating rays E' of the projector, which irradiate the upper glass substrate 1', are completely parallel light; firstly, all energy of illuminating rays of a region corresponding to the BM 12' (a carbon black polypropylene resin material) is converted into joule heat E1'; and secondly, in a region corresponding to the CF 11', about 70% of rays are converted into joule heat E2' generally (according to light valves with different color gamuts, the percentage is a little different). In terms of the current technology such as an LTPS (Low Temperature Poly Silicon) projection light valve technology, on production lines of generations of G3.5 and G5.5, the width (i.e., the line width) of the BM (i.e., 12') can challenge the size of 3-3.5 μm, and the width of the BM with the more mature technology is 3.5-4 μm. Obviously, for the FHD (Full High Definition) resolution of a larger-sized light valve of a single-LCD projector, such as a 4-inch light valve, the dimension of a region occupied by each pixel is 46 μm*46 μm; and if the line width of the BM is 3.5 μm, the area ratio of a BM region of each pixel and the pixel region is:

[3.5*46+3*3.5*(46−3.5)]/46² = 0.287

The average transmittance of the CF (i.e., 11') region is about 30% (actually, the average transmittance cannot reach such the high value unless the requirements on color gamuts of an image are not considered completely), so total incident rays blocked by the upper glass substrate 1' are:

$E1'+E2'=0.287+(1-0.287)*0.7=0.786E'$

Obviously, the upper glass substrate 1' gathers most energy (78.6%) of the incident rays E' and converts the energy into joule heat.

Meanwhile, according to a physical photon kinetic energy equation (Theorem of kinetic energy) and public knowledge, $E=hc/\lambda$; in the formula, E represents energy, and h is a Planck constant; and c is the speed of light in vacuum, and λ is the wavelength of rays. Obviously, the smaller λ is (the shorter the wavelength is), the more the energy carried by the rays is. Meanwhile, the damage of short wave rays (such as blue light) on the photochemical property of organic materials (the process and ingredients of the CF comprise but not limited to a solvent, a pigment, a dispersing agent, a monomer, a polymer, a light initiator and the like, which are nearly organic materials) is also very strong. The consequence is that an output image of the single-LCD projector has a serious color cast phenomenon on a projection screen; and the color cast phenomenon is an engineering problem difficult to solve, which can refer to some improvement methods for the color cast phenomenon in the Chinese patent "CN202121865344.0".

Figure 7:
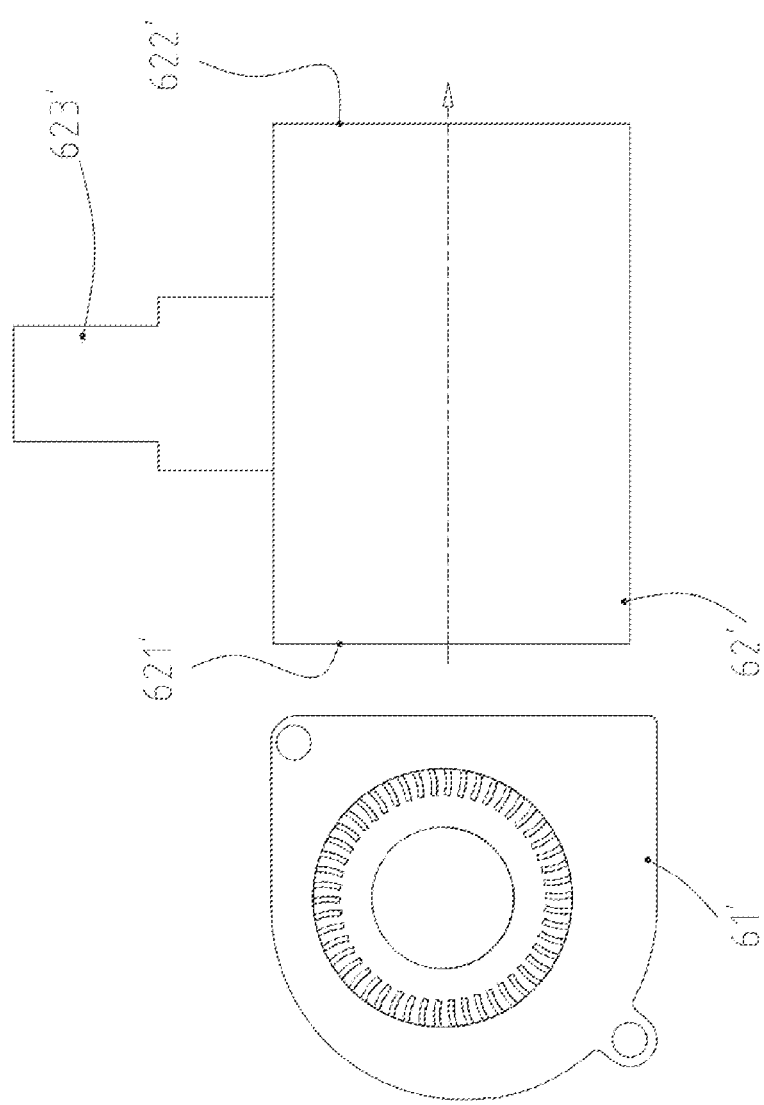
FIG. 7 is a typical air-cooling heat radiating manner of a light valve.
Figure 8:
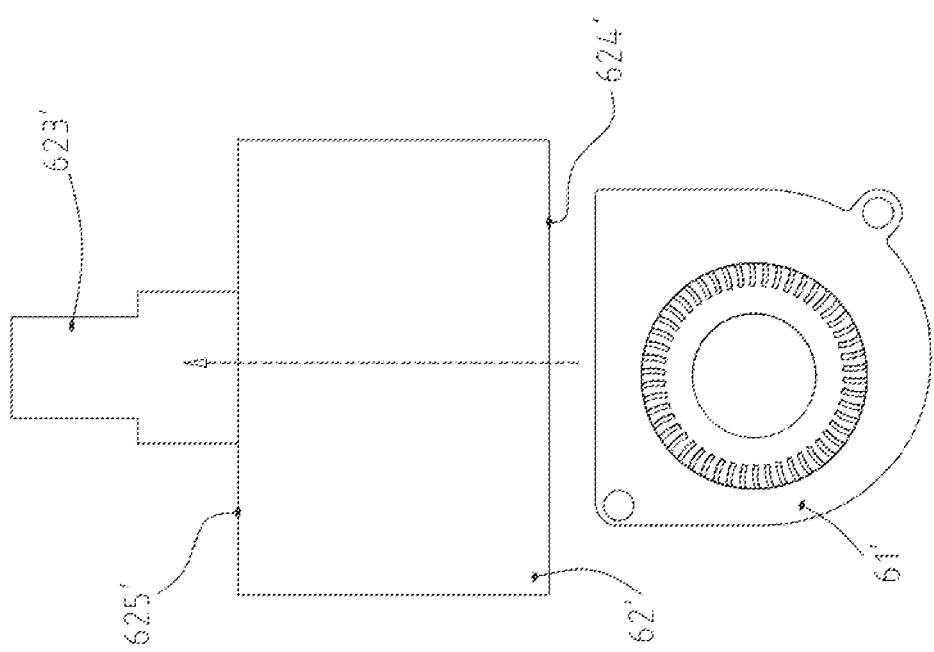
FIG. 8 is another typical air-cooling heat radiating manner of a light valve.

Continuing to refer to FIG. 7 and FIG. 8, in the figures, 61' is a heat radiating fan, and an arrow represents the flow direction of forced cooling air; 62' is an LCD light valve; 621' is a short side of the LCD light valve 62' and is the air inlet side; 622' is the other short side of the LCD light valve 62' and is the air outlet side; and 623' is an electronic flat cable of the LCD light valve 62'. In FIG. 8, 624' is a long side of the LCD light valve 62' and is the air inlet side, and 625' is the other long side of the LCD light valve 62' and is the air outlet side.

The current single-LCD projector adopts an air cooling manner in FIG. 7 or FIG. 8 to radiate heat for the LCD light valve at least. In FIG. 7, an image projected by the projector corresponds to the LCD light valve 62', the brightness at the side of the short side 621' (the air inlet side) of the LCD light valve 62' is higher (the transmittance is high), and the brightness at the side of 622' (the air outlet side) is lower, which causes non-uniformity of brightness. Meanwhile, the color temperature at the side of 621' (the air inlet side) is normal (or is lower relatively to the air outlet side), and the color temperature at the side of 622' (the air outlet side) is higher (or is higher relatively to the air inlet side), which causes non-uniformity of brightness. The above situations have great influence on aesthetic feeling of user experience. A heat radiating manner in FIG. 8 is similar to the performance in FIG. 7 without essential difference.

For a large-sized LCD TV (such as more than or equal to 40 inches), people hardly consider the heat radiating problem of an LCD; for example, 100 W of electric power is input into an LED backlight source of the TV, and about 30 W of light power is uniformly irradiated on a lower glass substrate of the TV (opposite to the incidence direction of rays of a general LTPS projection light valve). By taking a 60-inch TV (16:9) as an example, the light power on unit area is about 0.03 mW; when the light power is irradiated on a 4-inch projection light valve (16:9), the light power on unit area is about 6.8 mW, which has a difference of more than two orders of magnitude. Based on the irradiation of the negligible 0.03 mW-order light power, the TV does not consider the heat radiating problem generally, and even does not consider the problems of uniformly of brightness, uniformity of color and the like caused by temperature difference of an LCD display window. But the projector is different. 6.8 mW of light power is irradiated on unit area, and under the situation that the own transmittance, the specific heat and the heat conduction index are very low, heat radiating is the technical problem which is critical and must be solved.

The root cause of causing a phenomenon that the uniformity of brightness becomes poor is: at the air inlet side of the LCD light valve, since the temperature of air is relatively low, which has the maximum temperature difference from the surfaces of the glass substrates of the LCD light valve, the heat radiating of the LCD light valve is best, and each microstructure inside the LCD light valve and the liquid crystal box can normally work relatively. With the marching of air current, the temperature difference of forced air and the surface of the LCD light valve is smaller and smaller, and the heat radiating capacity is poorer and poorer, so that each microstructure inside the LCD light valve and the liquid crystal box cannot normally work relatively. Due to the reasons which comprise but not limited to the following aspects: due to the rise of temperature, the capacity of each storage capacitor is changed; the insulation resistance among the data cable, the scanning line and the ITO is reduced, and the leakage current is increased; and the migration rate of carriers of the TFTs is reduced, etc., finally, the optical rotation angle of liquid crystal molecules is not enough. When the color cast is detected by a polaroid at the emergence side of the LCD light valve, since the optical rotation angle of the liquid crystal molecules is not enough, the rays passing through the polaroid are reduced naturally; and therefore, the brightness turns down, and the non-uniformity of brightness occurs, i.e., the brightness of the projected image corresponding to the air inlet side of the LCD light valve is higher, and the brightness of the projected image corresponding to the air outlet side is remarkably lower.

The root cause of causing a phenomenon that the uniformity of color becomes poor is also similar. For example, the color temperature of the projected image corresponding to the air inlet side of the LCD light valve is normal, and the color temperature at the air outlet side is higher. At the air inlet side, since the cooling of the LCD light valve is best, and the work of each inside microstructure and the liquid crystal box is also most normal relatively, each color of R, G and B subpixels outputs rays according to a relatively normal design state. At the air outlet side, the R subpixel (an R filter) needs to absorb blue light and green light, the G subpixel needs to absorb blue light and red light, and the B subpixel needs to absorb red light and green light; and in the energy distribution of the illuminating rays, the energy of blue light is maximum, the energy of green light is second, and the energy of red light is weakest. Therefore, the energy absorbed by the R subpixel is relatively maximum, and the energy absorbed by the B subpixel is relatively minimum, so that the local temperature of the R subpixel is highest, and the optical rotation angle of liquid crystal molecules corresponding to the R subpixel is smaller than the optical rotation angle of liquid crystal molecules corresponding to the B subpixel relatively; and therefore, when the color cast is detected by the polaroid at the emergence side of the LCD light valve, compared with normal output, the weakening of the red light is largest, the color temperature is risen naturally, and the color cast of the image occurs.

Additionally, due to the characteristics of the own material of the R filter, under long-time irradiation of high-intensity blue light at high temperature, the following situations are caused, comprising but not limited to: the crystallization of the pigment occurs, and the monomer loses the filtration effect due to physical changes such as polymerization and the like, i.e., the transmittance of the R filter is lower and lower and is completely damaged finally; or, the absorption property of the R filter for green light and blue light is lower and lower, and the indexes such as the color, the contrast and the like of the output image are poorer and poorer finally.

Embodiment 1

Figure 1:
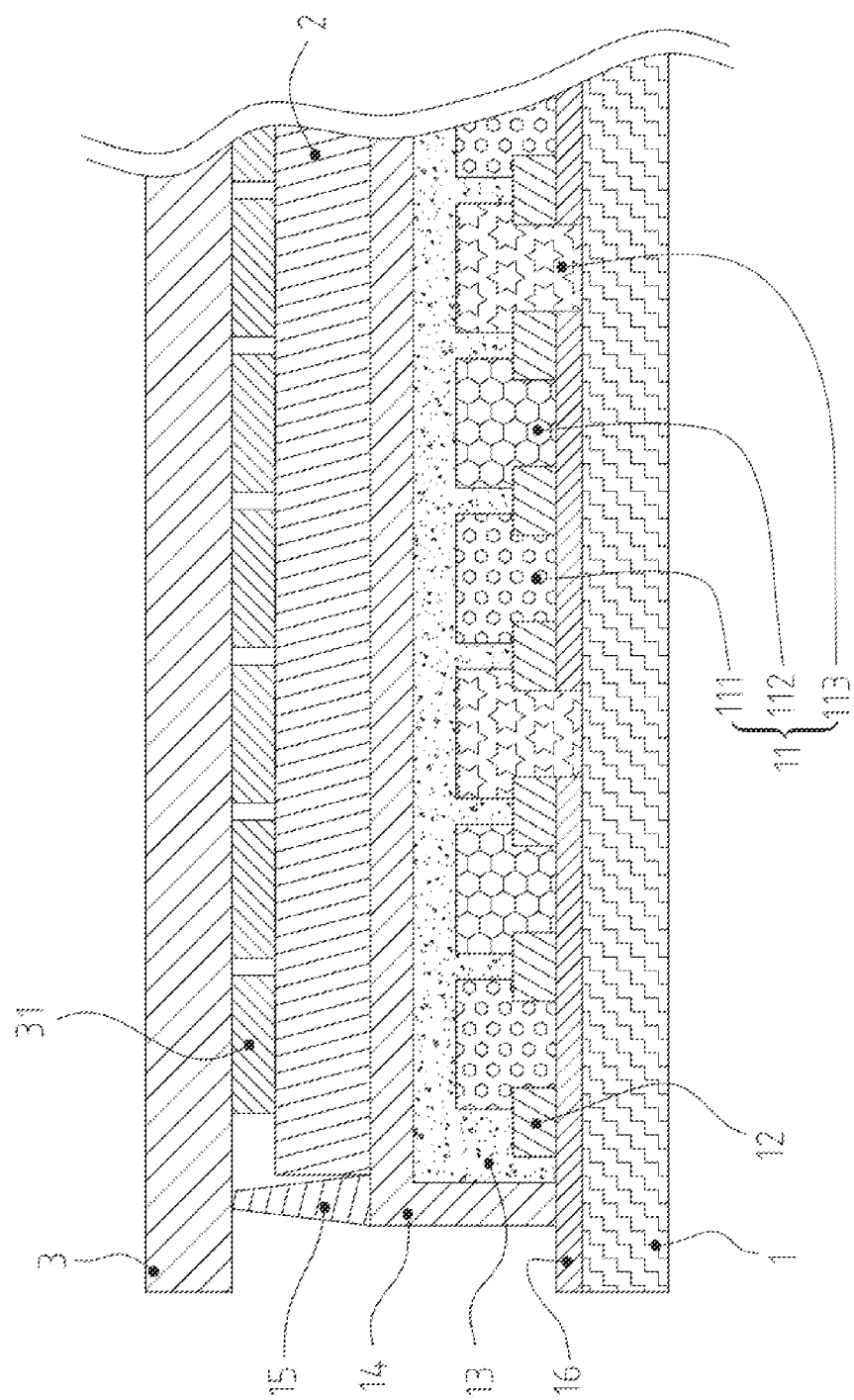
FIG. 1 is a cross-section schematic diagram of a heat reflection light valve of the present invention.
Figure 2:
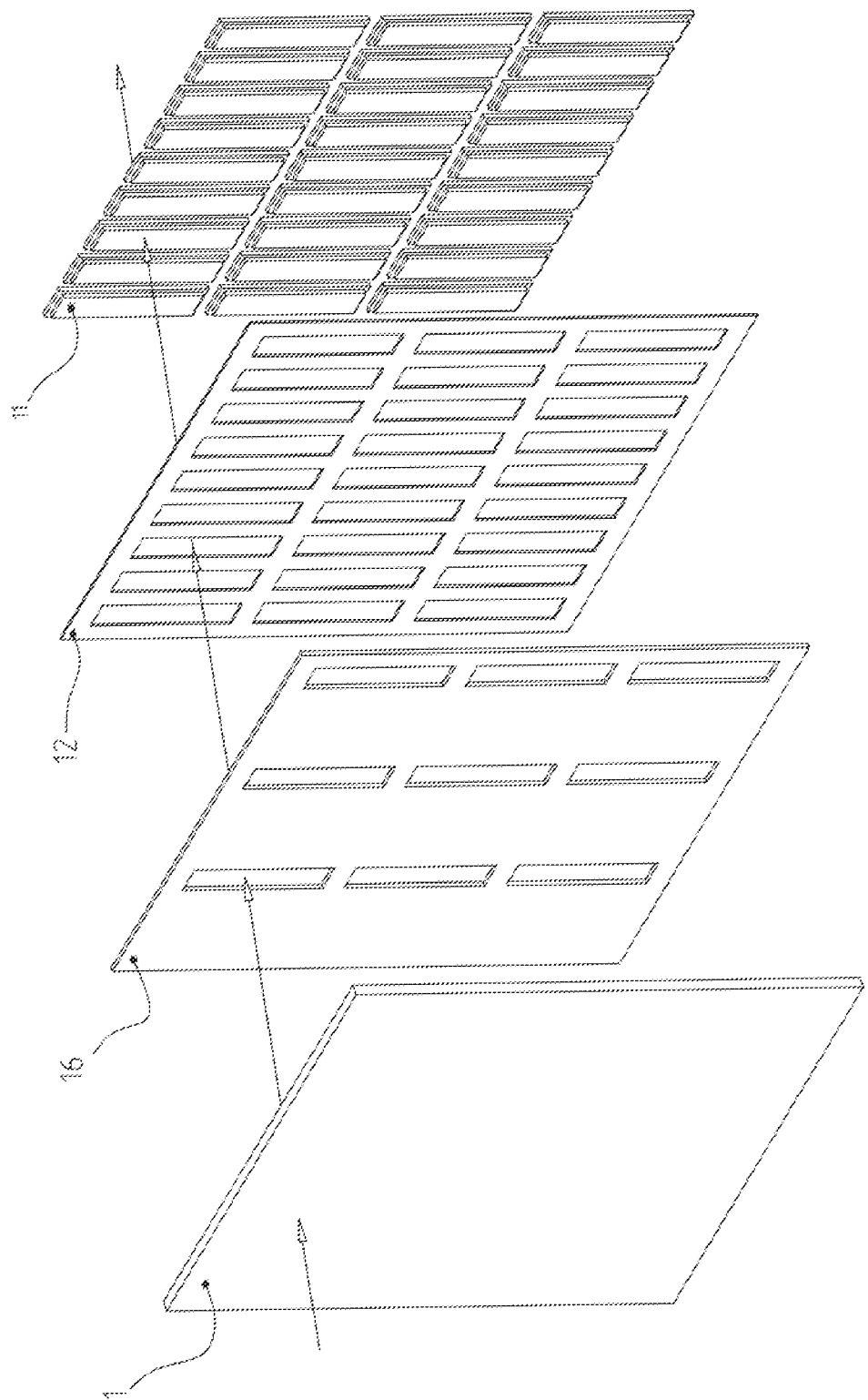
FIG. 2 is a microstructural decomposition display diagram of an upper glass substrate in FIG. 1.

With reference to FIG. 1 and FIG. 2, a heat reflection light valve in the embodiment comprises an upper glass substrate 1, a lower glass substrate 3 and a liquid crystal box 2 clamped between the upper glass substrate 1 and the lower glass substrate 3; and a TFT array 31 is produced on the lower glass substrate 3.

A CF 11, a BM 12, an OC 13, a transparent electrode 14, a post spacer 15 and other components are produced on the upper glass substrate 1. The CF 11 comprises a red filter matrix 111, a green filter matrix 112 and a blue filter matrix 113; and in FIG. 2, a 3*3 pixel array is taken as an example, so as to be convenient for clearly showing main microstructures of the upper glass substrate 1. Illuminating rays of a projector enter from the upper glass substrate 1 (with reference to the arrow direction in FIG. 2), and after being modulated by the liquid crystal box 2 and the TFT array 31 of the lower glass substrate 3, the illuminating rays are irradiated out.

In order to reduce the heat productivity of the prior art as described above, in the present invention, a layer of reflection film 16 for reflecting blue light is produced on the inner surface of the upper glass substrate 1, and the reflection film 16 is not produced in a region corresponding to the blue filter matrix 113, so that all the illuminating rays can irradiate the blue filter matrix 113 in the region, but the blue part of the illuminating rays does not irradiate the red filter matrix 111, the green filter matrix 112 and the BM surrounding the red filter matrix 111 and the green filter matrix 112. The reason is that the reflection film 16 is produced in the region, and the blue part of the illuminating rays is reflected.

Therefore, as regions corresponding to the red filter matrix 111 and the green filter matrix 112 are not irradiated by blue light, the heat productivity is reduced by ½, i.e., the red filter matrix 111 absorbs green light and does not absorb blue light, and the green filter matrix 112 absorbs red light and does not absorb blue light; and the heat productivity of a region corresponding to the BM surrounding the red filter matrix 111 and the green filter matrix 112 is reduced by ⅓, i.e., the BM only absorbs red light and green light and does not absorb blue light.

By taking the above 4-inch FHD light valve as an example, the energy of illuminating rays is E, so the heat productivity of the BM of the upper glass substrate 1 is: $0.287*⅔=0.191E$, the total heat productivity of the red filter matrix 111 and the green filter matrix 112 is 0.158E (i.e., $2*(1-0.287)*⅔*⅓*½$), and the heat productivity of the blue filter matrix 113 is the same as the prior art and is still 0.158E; and therefore, the total heat productivity of the BM and the CF is 0.508E, which is only 65% of the heat productivity 0.786E' of the prior art. If the heat productivity of the blue filter matrix 113 in the present invention and the prior art is not changed is not considered, the heat productivity of the present invention is only about 56% of the prior art, i.e., $(0.508-0.158)/(0.786-0.158)=0.56$, which greatly reduces the heat radiating burden of the LCD light valve and has the positive effects on improvement of noise of the heat radiating fan of the LCD light valve and poor uniformity of brightness. Meanwhile, under the situation that the heat radiating of the LCD light valve is allowed, stronger ray irradiation is allowed, so as not to cause failure of the LCD light valve.

More importantly, the damage of blue light on the photochemical property of all the above organic materials (including the BM) is very strong; in the regions of the red filter matrix 111, the green filter matrix 112 and the BM surrounding the red filter matrix 111 and the green filter matrix 112, the harm of blue light is relieved; and therefore, the durability of the LCD light valve can be remarkably improved. Particularly, for the material of the red filter matrix 111, the property of resisting the damage of blue light is very poor under the situation of working at higher temperature for a long time.

The present invention has very obvious benefits of improving the local color cast of the projected image and the like; and at the air outlet side of the LCD light valve, the possibility that the R subpixel has local high temperature is reduced. After the light valve with the reflection film 16 produced in the present invention is installed, a color cast phenomenon is greatly improved, and good viewing and experience feelings of users are enhanced. Compared with the defect of the uniformity of brightness, bad experience of color cast brought to the users is more serious.

The implementation of the technology of the present invention is different from a great majority of types of technologies of innovations in the existing industries; as a layer of reflection film 16 for reflecting blue light is produced on the inner surface of the upper glass substrate 1, which means that the existing production process of the LCD light valve of a glass original factory (factories such as BOE, China Star Optoelectronics Technology and the like) is changed and also means the innovation for the production process of the glass original factory.

The changed process only aims at the production process of the upper glass substrate 1, and other processes of the LCD light valve are not changed. The process of the present invention is inserted between cleaning of the glass substrate (a first process) and production of the BM (a second process). For the reflection film 16 produced by adopting a vacuum evaporation coating method, a magnetron sputtering coating method or a vapor deposition method, a light cover needs to be added, i.e., the reflection film for reflecting blue light is produced on the entire plane of the glass substrate firstly, then the reflection film for reflecting blue light in the region corresponding to the blue filter matrix 113 is removed, and after the entire plane of reflection film for reflecting blue light is produced, the processes including coating, exposure, photoresist peeling, and cleaning again need to be carried out. Meanwhile, the management and control for necessary materials such as hydrochloric acid, zinc powder and cerium oxide powder have strict requirements, and therefore, the cost of the LCD light valve is also increased finally. However, relative to the larger market volume brought out by remarkable improvement of the property and remarkable enhancement of product quality, the forward promotion of the industry and the better user experiment valve that are obtained by the projector hence, the present invention is still worthy of implementation.

Embodiment 2

Figure 3:
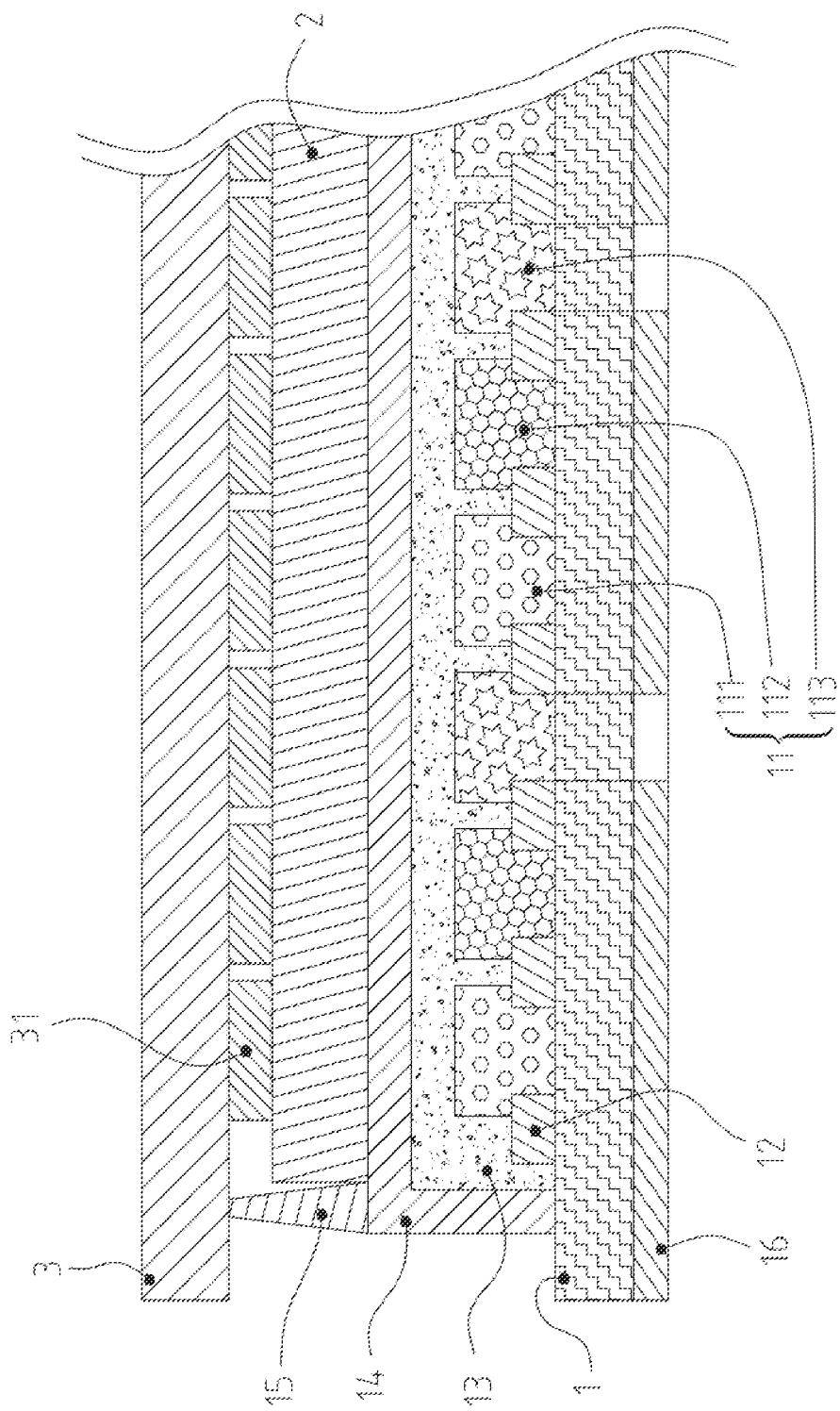
FIG. 3 is a cross-section schematic diagram of an embodiment of a heat reflection light valve of the present invention.
Figure 4:
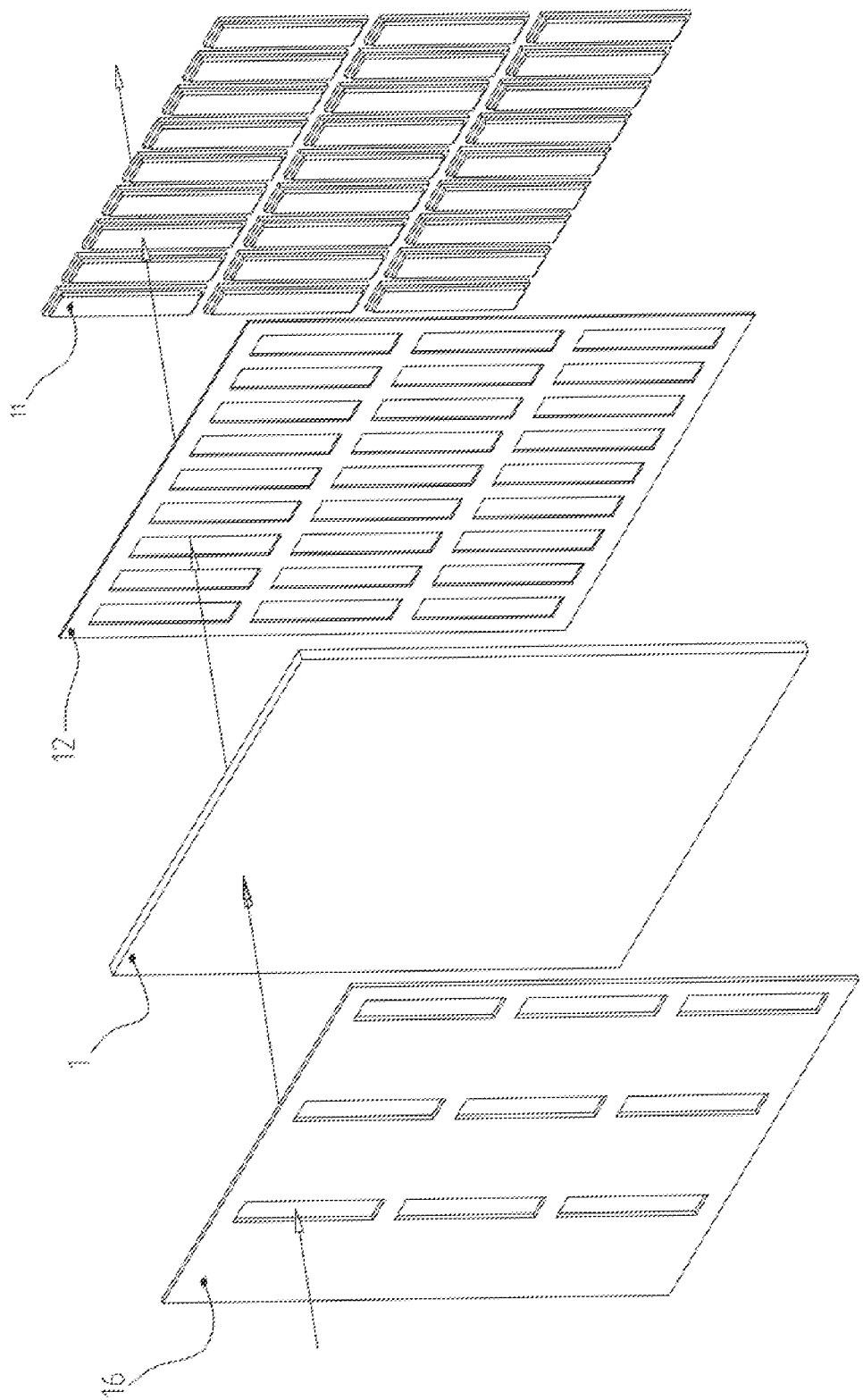
FIG. 4 is a microstructural decomposition display diagram of an upper glass substrate in FIG. 3.

With reference to FIG. 3 and FIG. 4, a heat reflection valve comprises an upper glass substrate 1, a lower glass substrate 3 and a liquid crystal box 2 clamped between the upper glass substrate 1 and the lower glass substrate 3; and a TFT array 31 is produced on the lower glass substrate 3.

A CF 11, a BM 12, an OC 13, a transparent electrode 14, a post spacer 15 and other components are produced on the upper glass substrate 1. The CF 11 comprises a red filter matrix 111, a green filter matrix 112 and a blue filter matrix 113. In FIG. 4, a 3*3 pixel array is taken as an example, so as to be convenient for clearly showing main microstructures of the upper glass substrate 1. Illuminating rays of a projector enter from the reflection film 16 and pass through the upper glass substrate 1, and after being modulated by the liquid crystal box 2 and the TFT array 31 of the lower glass substrate 3, the illuminating rays are irradiated out.

In other words, the above structure is completely the same as the LCD light valve of the prior art shown in FIG. 6. However, the difference is that the reflection film 16 for reflecting blue light is produced on an incident plane of the upper glass substrate 1, and the reflection film 16 is not produced in a region corresponding to the blue filter matrix 113.

Since the illuminating rays of the projector are absolute parallel light impossibly, if the embodiment is mainly used for improving the heat productivity of the upper glass substrate 1, it is inevitable that the efficiency that the rays irradiate the blue filter matrix 113 is sacrificed appropriately; or, the efficiency loss that the rays irradiate the blue filter matrix 113 is reduced as far as possible, the blue light reflection amount for the red filter matrix 111, the green filter matrix 112 and the BM surrounding the red filter matrix 111 and the green filter matrix 112 is reduced, and therefore, the heat productivity is increased (relative to the embodiment 1).

However, relative to the process difficulty and the production cost of the embodiment 1, the embodiment has obvious advantages. Meanwhile, for reduction of the damaging power and the heat productivity of blue light for the red filter matrix 111, the green filter matrix 112 and the BM surrounding the red filter matrix 111 and the green filter matrix 112, the embodiment still has a certain value. Under the situations that the upper glass substrate 1 is thinner, and the pixel size is larger, the influence of illuminating rays Fno (apertures) on the embodiment is smaller relatively; and the illuminating rays Fno have larger practical values relatively. It needs to be noted that whether the reflection film 16 is produced on the incident plane or the inner surface of the upper glass substrate 1 on earth needs to consider the influence of an LCD mode such as TN, VA or IPS (Information Processing System) and the like selected by the above LCD light valve.

Embodiment 3

Figure 5:
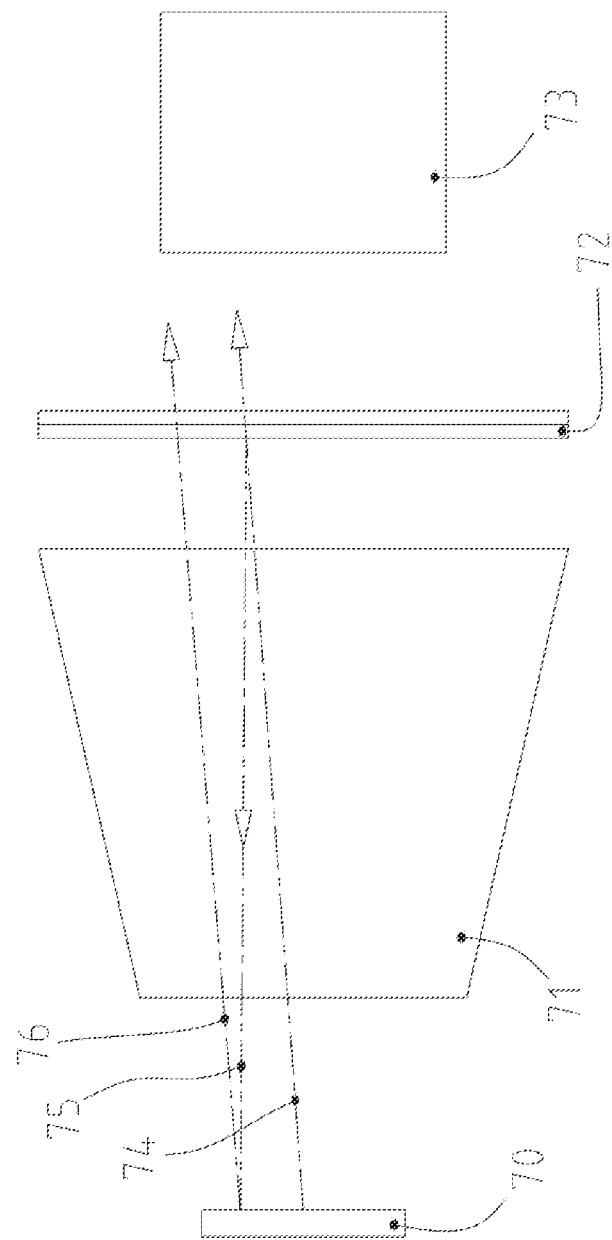
FIG. 5 is a schematic diagram of another embodiment.

With reference to FIG. 5, the embodiment is a projector applying a heat reflection light valve, and the projector is sequentially provided with a white LED light source 70, an illuminating device 71, a heat reflection light valve 72 and an imaging device 73 according to the marching direction of rays.

The white LED light source 70 adopts a high-power COB (Chip On Board) light source of the technology of a blue LED wafer and yellow fluorescent powder. A ray 74 emitted by any point of the white LED light source 70 is converged by the illuminating device 71 and then irradiates the heat reflection light valve 72.

Blue light 75 reflected by the heat reflection light valve 72 passes through the reasonably designed illuminating device 71, so that the blue light 75 can be focused in a light-emitting region of the white LED light source 70 to stimulate the yellow fluorescent powder to emit light (a ray 76) and increase the luminous flux output of the white LED light source 70, so as to enhance the output brightness of the projector to a certain extent.

In the embodiment, for the heat reflection light valve applying the technology of the present invention, compared with the LCD light valve of the prior art relatively, if the efficiency of the illuminating device 71 is 65%, the blue light stimulation amount for the yellow fluorescent powder of the light source can increase about 6.1% of light power theoretically, so as to increase the luminous flux output of the light source correspondingly; and due to various limits of production reality of a product in practice, after the simulation of the reflected blue light for the fluorescent powder in the embodiment is actually measured, the projector can increase about 3%-3.5% of luminous flux output.

The contribution of the above negligible increase data of the luminous flux can be neglected for one projector. However, for single-LCD projectors with the market volume of tens of millions each year, if the projectors keep the same luminous flux output as the prior art, each projector can save energy consumption at a corresponding proportion (a load occupying absolute electricity consumption inside the projector is a light source), which still has a certain society value, is worthy of being tried in the product and pushes the product and the market to advance.

The above shows and describes the basic principles, main features and advantages of the present invention. Those skilled in the art shall understand that the present invention is not limited by the above embodiment. The above embodiment and the description merely illustrate the principle of the present invention. Various changes and improvements can also be made to the present invention without departing from the spirit and scope of the present invention, and shall fall into the protection scope of the present invention. The protection scope of the present invention is defined by the appended claims and equivalents.

The invention claimed is:

1. A heat reflection light valve of a Liquid Crystal Display (LCD) projector, comprising an upper glass substrate, a lower glass substrate and a liquid crystal box clamped between the upper glass substrate and the lower glass substrate, wherein a TFT (Thin Film Transistor) array is produced on the lower glass substrate; a CF (Color filter), a BM (Black Matrix), an over coater, a transparent electrode and a post spacer are produced on the upper glass substrate; the CF comprises a red filter matrix, a green filter matrix and a blue filter matrix; illuminating rays of the projector enter from the upper glass substrate, and after being modulated by the liquid crystal box and the TFT array of the lower glass substrate, the illuminating rays are irradiated out, wherein a layer of reflection film for reflecting blue light is produced on the inner surface of the upper glass substrate, and the reflection film is not arranged in a region corresponding to the blue filter matrix.

2. The heat reflection light valve of the LCD projector according to claim 1, wherein the reflection film for reflecting the blue light is produced on an incident plane of the upper glass substrate, and the reflection film is not arranged in a region corresponding to the blue filter matrix.

3. The heat reflection light valve of the LCD projector according to claim 1, wherein the reflectivity of the reflection film is greater than or equal to 95% within the wavelength range of 420-450 nm at least and is cut off completely when the wavelength is greater than or equal to 475 nm, and the reflection film can transmit rays with the wavelength of greater than or equal to 475 nm.

4. The heat reflection light valve of the LCD projector according to claim 1, wherein the layer of reflection film is produced by adopting any one of a vacuum evaporation coating method, a magnetron sputtering coating method or a vapor deposition method.

5. A projector, comprising the heat reflection light valve of the LCD projector of claim 1, and further comprising a white LED (Light-Emitting Diode) light source, an illuminating device and an imaging device; and the white LED light source, the illuminating device, the heat reflection light valve and the imaging device are sequentially arranged according to the marching direction of rays.

6. A method for manufacturing a layer of reflection film on a heat reflection light valve of a Liquid Crystal Display (LCD) projector, wherein the LCD projector comprises an upper glass substrate, a lower glass substrate and a liquid crystal box clamped between the upper glass substrate and the lower glass substrate, wherein a TFT (Thin Film Transistor) array is produced on the lower glass substrate; a CF (Color filter), a BM (Black Matrix), an over coater, a transparent electrode and a post spacer are produced on the upper glass substrate; the CF comprises a red filter matrix, a green filter matrix and a blue filter matrix; illuminating rays of the projector enter from the upper glass substrate, and after being modulated by the liquid crystal box and the TFT array of the lower glass substrate, the illuminating rays are irradiated out;

wherein the method comprises:
producing the reflection film for reflecting blue light on an entire plane of the upper glass substrate; and
removing the reflection film for reflecting blue light in a region corresponding to the blue filter matrix;
wherein the layer of reflection film is produced by adopting any one of a vacuum evaporation coating method, a magnetron sputtering coating method or a vapor deposition method.

7. The method according to claim 6, wherein a layer of reflection film for reflecting blue light is produced on the inner surface of the upper glass substrate, and the reflection film is not arranged in a region corresponding to the blue filter matrix.

8. The method according to claim 6, wherein the reflection film for reflecting the blue light is produced on an incident plane of the upper glass substrate, and the reflection film is not arranged in a region corresponding to the blue filter matrix.

* * * * *